A. PENTECOST.
CALCULATING MACHINE.
APPLICATION FILED FEB. 28, 1905.

1,049,527.

Patented Jan. 7, 1913.

Witnesses

Inventor
Arthur Pentecost
by
Attorneys

Fig. 3.

A. PENTECOST.
CALCULATING MACHINE.
APPLICATION FILED FEB. 28, 1905.

1,049,527.

Patented Jan. 7, 1913.
9 SHEETS—SHEET 7.

Witnesses

Inventor
Arthur Pentecost
by Foster Freeman Watson
Attorneys

UNITED STATES PATENT OFFICE.

ARTHUR PENTECOST, OF EAST ORANGE, NEW JERSEY, ASSIGNOR, BY MESNE ASSIGNMENTS, TO BURROUGHS ADDING MACHINE COMPANY, OF DETROIT, MICHIGAN, A CORPORATION OF MICHIGAN.

CALCULATING-MACHINE.

1,049,527.   Specification of Letters Patent.   Patented Jan. 7, 1913.

Application filed February 28, 1905. Serial No. 247,650.

*To all whom it may concern:*

Be it known that I, ARTHUR PENTECOST, a subject of the King of Great Britain, residing at East Orange, Essex county, State of New Jersey, have invented certain new and useful Improvements in Calculating-Machines, of which the following is a specification.

This invention relates to improvements in calculating machines of the character which are adapted to both accumulate and record a series of items and also record the total or sum of the several items which have been previously recorded and accumulated. In connection with such machines it is very desirable that means be provided whereby whenever a number representing the sum previously recorded and accumulated items is recorded, it will be clearly distinguished from the recorded items.

To provide such a machine with means for automatically printing a distinguishing mark or character simultaneously with the recording of a number representing the sum of previously recorded items, is the object of the invention.

For purposes of illustration the invention is shown in the accompanying drawings as applied to a calculating machine of the character shown in Letters Patent No. 763,692, granted June 28, 1904, for an invention of W. H. Pike, Jr. It will be evident, however, that the invention is adapted for use in connection with other calculating machines than the one illustrated in the drawings.

Figures 5, 16:
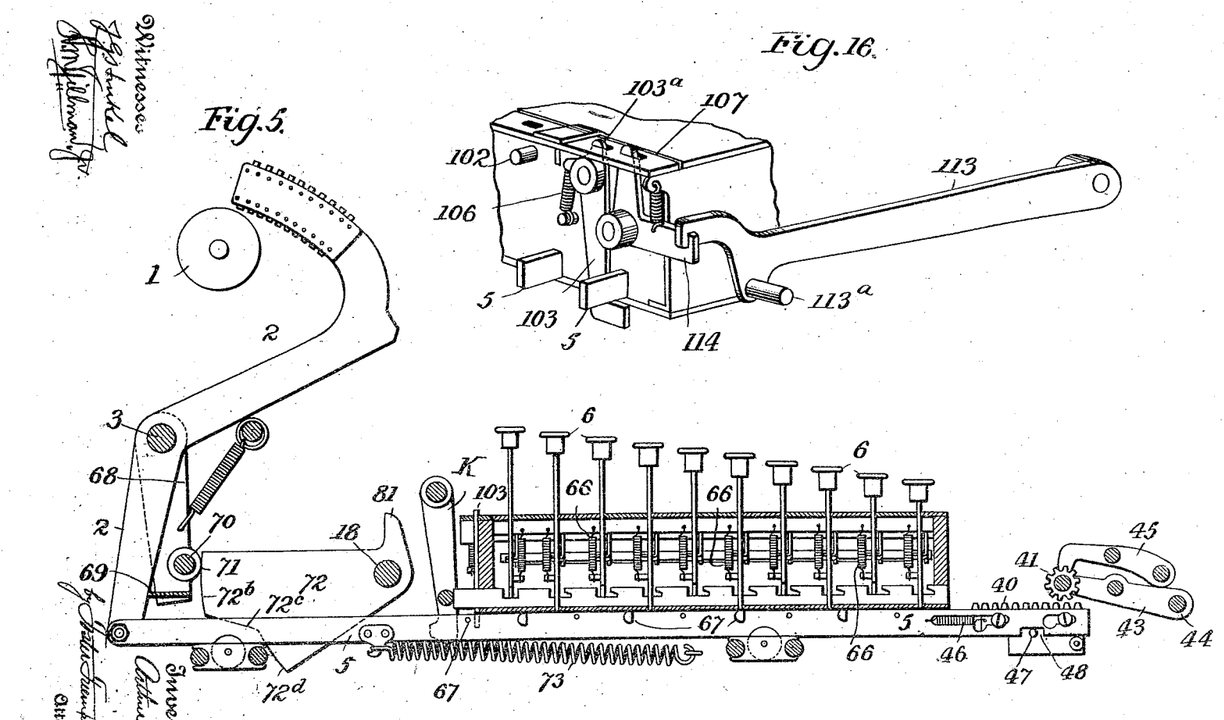
Fig. 5 is a longitudinal central section through the machine, parts being removed for the sake of clearness.
Fig. 16 is a detail perspective view of a detent shifting device used in connection with the "total" and "sub-total" mechanisms.

In the drawings, 1 designates the roller platen of the machine which is arranged below the curved type carrying levers 2, one to each series of keys, hereinafter referred to, which oscillate or rock on a shaft 3, each being joined to a strip 5 carrying a rack 40, which actuates the pinions 41, Figs. 5 and 12, secured to the adding wheels 42, carried by a swinging frame consisting of suitable arms 43 connected by cross bars and adapted to rock about a shaft or rod 44 mounted in the main frame of the machine. Fixed pawls 45 serve to lock the pinions 41, to prevent accidental turning. Each rack 40 has a sliding movement on the strip 5 and is drawn back by a spring 46, Figs. 5, 11, 12, and 13. A lug 47, Figs. 5, 11, and 12, on the rack projects into a recess 48 in the strip and limits the sliding movement of the rack.

Figure 11:
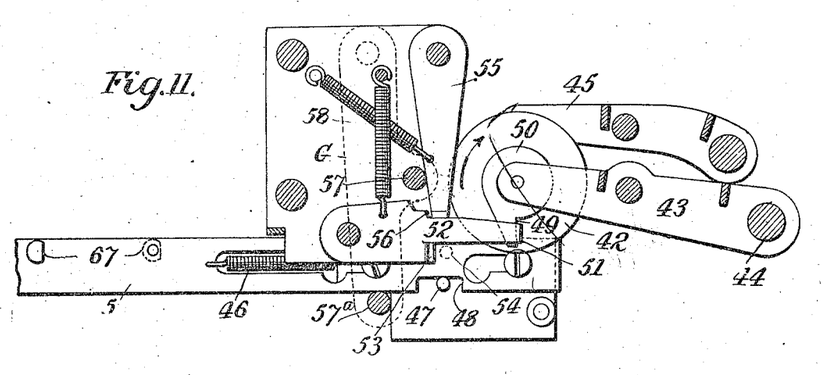
Fig. 11 is a sectional side view of the adding mechanism on the line 11—11 of Fig. 13.
Figure 13:
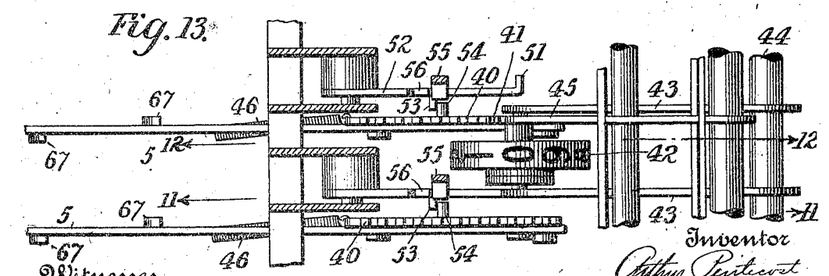
Fig. 13 is a plan view of a portion of the adding mechanism.

When the adding wheels are turned in the direction of the arrow in Fig. 11, the shoulders 49, of cams 50, (one at the side of each adding wheel) are carried away from lugs 51 at the ends of detents 52, and the inclined edge of each cam 50 will nearly contact with the end of its detent 52 when the wheel has been turned nine units or steps. In moving the tenth step, the inclined edge of the cam will depress the detent, which will thus carry a lug 53 on the detent out of the path of a stud 54, Figs. 11 and 13, on the rack that co-acts with the adding wheel of the next higher order of numbers and the rack will thus be permitted to move a step beyond its normal position at rest and thus move its co-acting pinion and adding wheel a step upon the completed revolution of the cam 50 of the wheel of the lower order.

Figure 7:
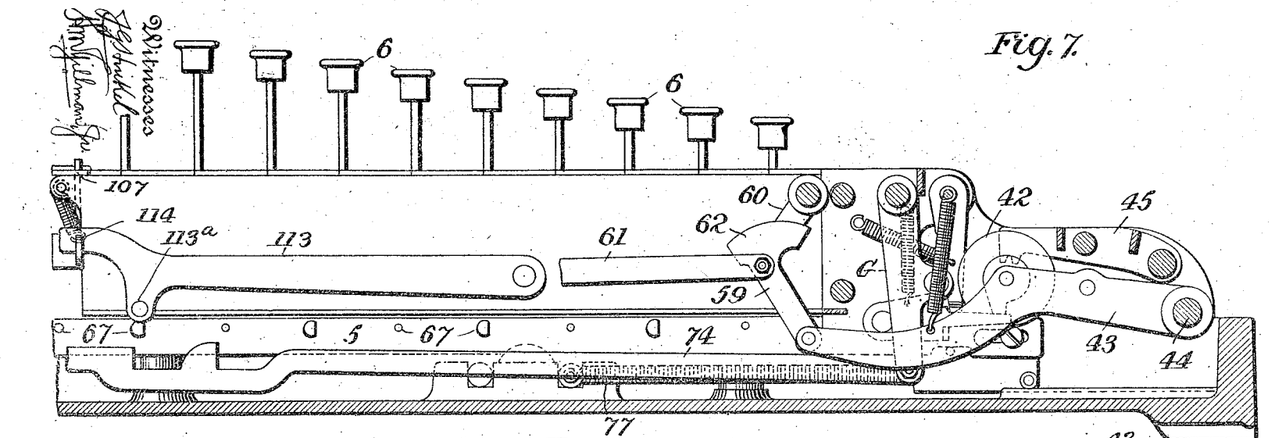
Fig. 7 is a side elevation of the front portion of the machine.
Figure 8:
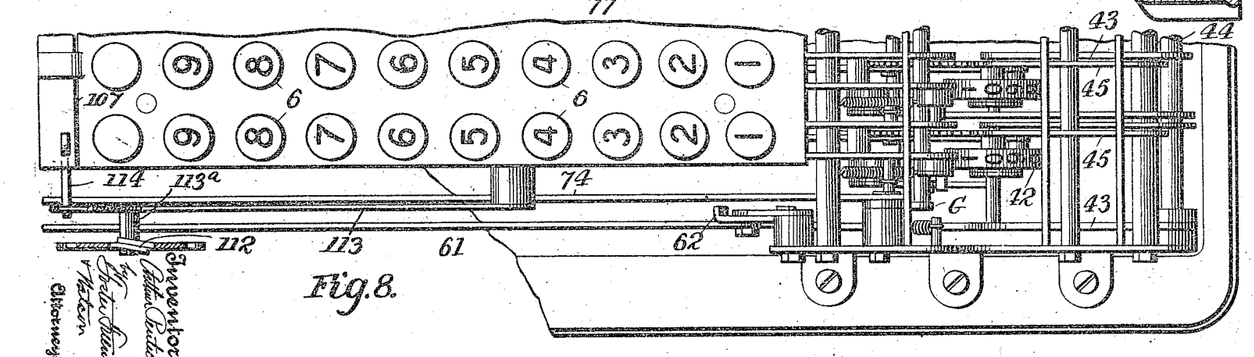
Fig. 8 is a plan of the parts shown in Fig. 7.
Figure 12:
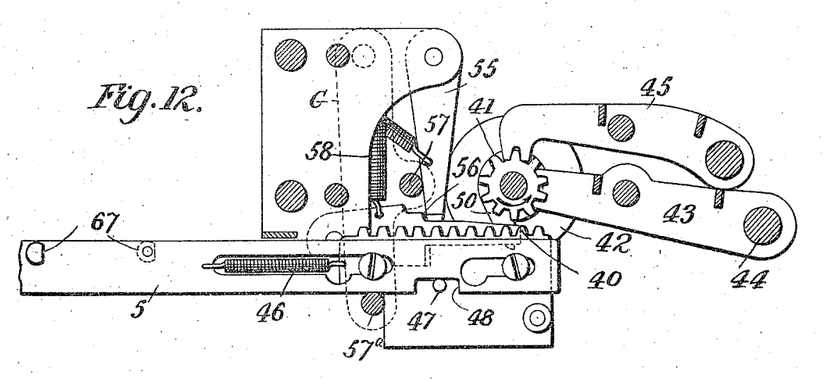
Fig. 12 is a similar view on the line 12—12 of Fig. 13.

When the detent 52 is depressed a vertical pawl 55 will be drawn over a shoulder 56 of the detent and then prevent the detent from rising until a frame G, Figs. 7, 11 and 12, swings back a bar 57 carried thereby and pushes back the pawls 55 from the shoulders 56 of the detents 52, which are then lifted by springs 58.

The frame carrying the adding wheels is swung to move the pinions of said wheels into and out of engagement with the racks by two i..._, 'ent means actuated from the working shaft 18. Thus the left hand arm 43 of said frame connects with a toggle link 59 joined to another toggle link 60, the movement of the toggle raising and lowering the frame carrying the adder wheels. The toggle is operated from a reciprocating link 61, the movement being limited by a lug on a plate 62 at the end of the link 59.

Figures 1, 4:
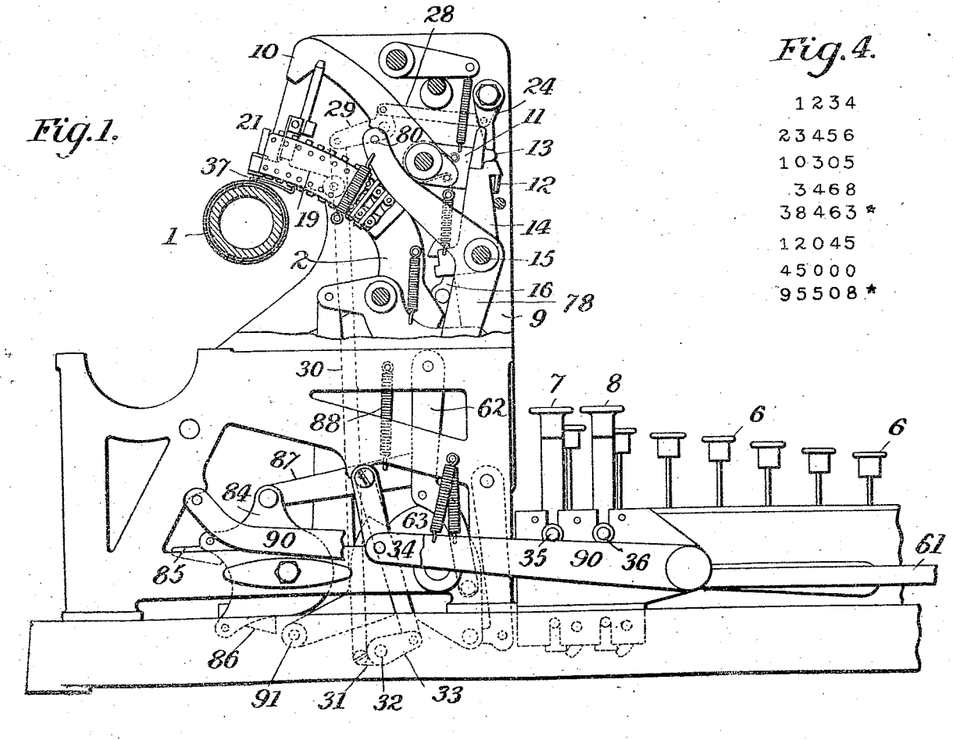
Figure 1 is a side elevation of a portion of a Pike calculating and adding machine having the present invention applied thereto, the upper portion of the side plate of the recorder of such machine being broken away.
Fig. 4 represents a series of recorded items.
Figure 6:
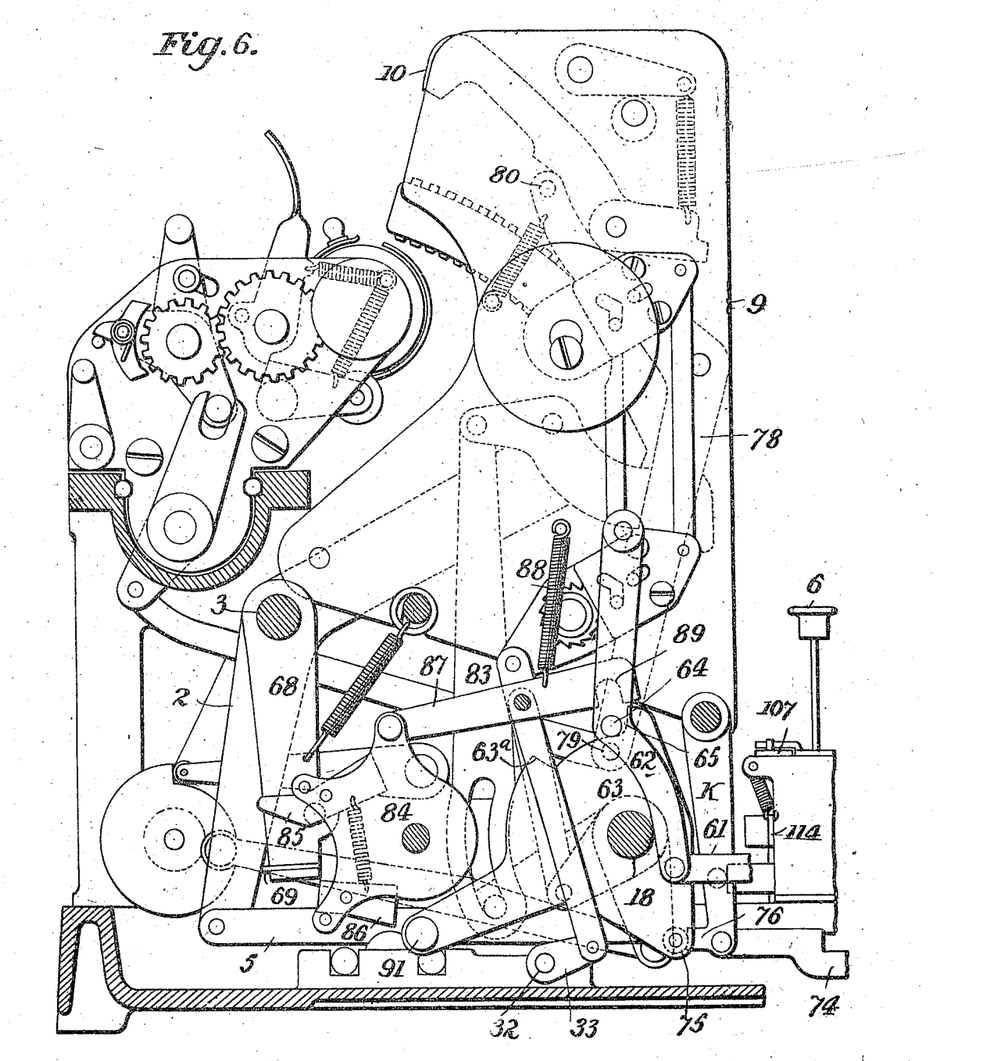
Fig. 6 is a side elevation of the rear portion of the machine on the same scale as Figs. 2 and 3.

The link 61 is connected to an arm 62, Figs. 1 and 6 and, as the working shaft 18 oscillates in one direction, the rear shoulder 63ª on a plate 63 on said shaft, contacts with a stud 64 on the lever 62, which swings forward. The return movement brings the shoulder 65 against the stud 64 swinging back the lever 62 and operates the aforesaid toggle in a manner the reverse of that due to the action of the shoulder 63ª on the stud 64.

The keys 6, by which the action of the accumulating and recording devices is controlled are arranged in rows, there being one row of such keys for each of the type carrying levers 2. Each key is normally held in its elevated position by a spring 66, and means are provided whereby when either key of a row is depressed such key will be held in its depressed position. On depressing a key the lower end of its stem is brought into the path of one of a series of studs or stops 67 projecting in both directions from the co-acting rack strip 5 and the key stem thus limits and defines the subsequent movement of the strip and rack and the extent to which the number wheel 42 is turned, the stops 67 being progressively farther from the key stems so that the strip moves to a greater extent in proportion as the key depressed indicates a higher number, as shown, and the parts are arranged so that each strip has a movement of one step at each operation of the machine, even if no keys may have been depressed. This will bring the cipher printing character on the type carrier 2 into the printing line, but without turning the adding wheel associated with such type carrier. The normal position of the stop 67 on the strip 5 which co-acts with each key numbered "1" is two steps to the rear of said key, the position of the other stops 67 being progressively one step farther to the rear of its co-acting key stop, the stud 67 which co-acts with each "9" key being ten steps away. The type lever shaft 3, Figs. 3, 5 and 6, carries two pendent arms 68 connected by a cross strip 69 and cross rod 70, the latter carrying a roll 71, which bears on a cam plate 72 on the working shaft 18. The strip 69 holds the lower ends of the type carrying levers 2 in their rearmost positions, each against the tension of a spring 73.

Figure 14:
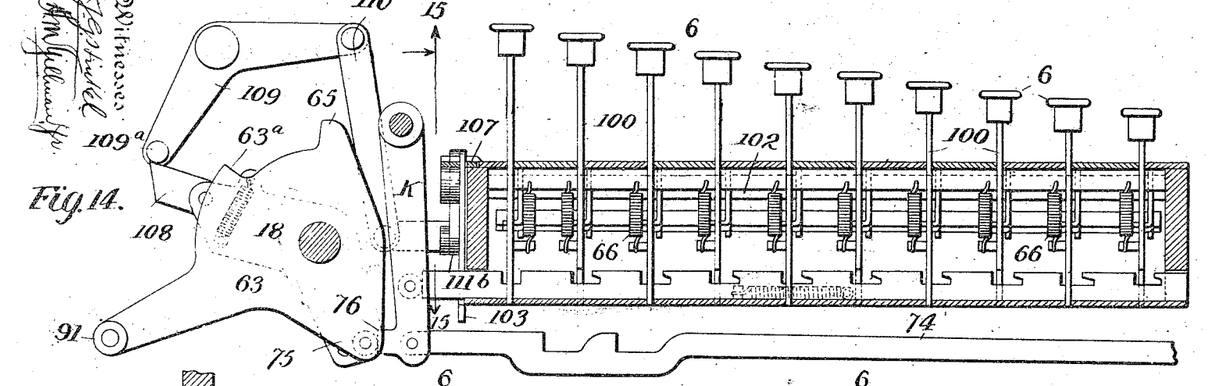
Fig. 14 is a sectional view of the key operating mechanism.
Figure 15:
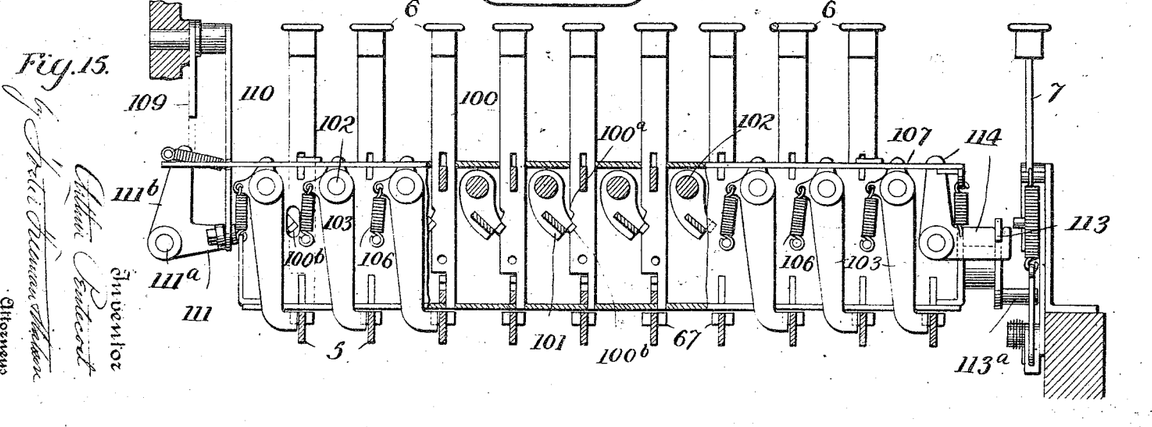
Fig. 15 is a vertical section on the line 15—15 of Fig. 14, looking in the direction of the arrow.

The stem 100, Figs. 14 and 15, of each numbered key 6 has notches 100ª and 100ᵇ of different depths formed therein. Springs 66, as aforesaid, act to lift the keys; and pawls 101 which are secured to longitudinal shafts 102, are adapted to engage said notches in the key steams and hold down the keys, the pawls of each series of keys being on the adjacent shaft, so that after one key of a series is depressed, the depression of another key in the series will swing out all the pawls and release the depressed key, which will rise. The highest or upper key of each series is blank or provided with no number and the depression of such blank key of a row swings the pawls to liberate a key of that row which has been improperly depressed, the blank key rising as soon as pressure is removed therefrom, as the notches of such blank keys are not arranged to be held down by the pawls.

A detent arm 103, Figs. 3, 5, 14, 15, secured on each shaft 102, near its end, is held in the path of the stop 67 on the strip 5 near the number "9" key by a spring 106, which also tends to turn the shaft 102 and hold the pawls 101 against the key stems and in the notches thereof. When all the keys in a column are up, the pawls 101 are all in the deep notches 100ᵇ and the detent arm 103 of each shaft acts as a stop for the co-acting strip 5, which can only move one step forward until its stop 67 strikes the arm 103, securing the result before stated. Such single step movement of the strip 5 does not move the rack 40 as the notch 48 in the sliding strip 5 is of such length that the end wall thereof does not engage the pin 47 of the rack until after such single step movement of the strip 5 has been completed. The shafts 102 can be rocked automatically to throw out all the pawls 101 by a sliding cross strip 107, having elongated slots into which project lugs 103ª. This is effected from the rocking of the working shaft 18. Thus at the commencement of the motion of the shaft 18, an arm on said shaft carries a latch 108 past a stud 109ª on a lever 109, a spring permitting the latch to yield and pass by the stud, and on the return motion of the shaft 18, the beveled edge of the latch 108 contacting with the stud 109ª swings the lever 109 and passing by permits the lever to return to its normal position. This lever 109 is connected by a link 110 with an angle lever 111, Figs. 14 and 15, pivoted at 111ᵃ to the side frame and provided with an arm 111ᵇ Figs. 14 and 15, which extends loosely through a slot in the end of the strip 107 and the movement of the lever 109 will thus rock the lever 111 and slide the strip 107 in the direction of the arrow Fig. 15, and thereby withdraw all of the pawls 101 and release any key which may have been depressed.

When a numbered key 6 is depressed the strip 5 moves forward until its stop 67 strikes the stem of said key, carrying the rack 40 without turning the pinion of its associated adder wheel, the frame carrying such wheels being normally elevated. After the movement of the strips ceases, the frame carrying the adder wheels is automatically depressed and the pinions 41 each engages a rack 40. On the return movement of the strips 5 each rack turns the pinion engaged thereby and the adding wheel connected to such pinion, the extent of revolution depending on the distance the strip 5, in returning to its position, moves the rack.

To the swinging frame G, Fig. 7, and dotted lines Figs. 11 and 12, are attached two longitudinal rods 74, which are connected to a swinging frame K, Figs. 3, 5, 6 and 9. A roller stud 75 on the plate 63 and a similar stud at the opposite side of the machine contact with projections 76 on the frame K, and the swinging frame G is thus held in forward position.

In operating the machine, the working shaft 18 is rocked by suitable connections from the operating shaft, and the roller studs holding the frames K and G in their forward positions, are first withdrawn and the frame G moved rearwardly by springs 77 so that the pawls 55, Figs. 11 and 12, will bear against the edges below the shoulders 56 of the detents 52 under spring tension, and the racks 40 can be drawn by their springs 46 backward with their lugs or stops 54 resting against the lugs 53. When a number key or keys have been depressed and the working shaft 18 is operated each coöperating strip 5 is carried forward to an extent depending on the key depressed. The swinging frame carrying the adder wheels is then depressed to bring each pinion 41 into engagement with its rack 40 and on the next backward movement of each strip the number wheel is turned to an extent corresponding to that to which the rack was carried forward. If any one wheel is turned sufficiently to depress the adjacent detent 52, the backward swing of the frame G will then permit the pawl 55 to swing back, when, having escaped contact with the edge in front of the shoulder 56, it passes above said shoulder as the cam 50 depresses the detent and the pawl 55 then holds down the detent until the wheel completes its movement and the action for carrying to the next wheel is effected. As the movement of the working parts of the machine terminate, the frame G swings forward and the pawls 55 are swung forward to normal positions and release the detents 52 which then rise. This also moves the racks 40 forward to normal position by the contact therewith of the cross bar 57ᵃ carried by the arms of the frame G. It will be understood that each spring 46 forms a flexible connection between one of the strips 5 and the rack 40 supported by said strip. Normally the stud or pin 53 holds the rack 40 in such position that the spring 46 connected to that rack, is under tension. If during the operation of the machine, the strip 5 and rack 40 of the order to which a carrying operation is to be imparted are stationary, or in their normal positions at the time the cam 50 of the adding wheel 42 of the next lower order rocks the lever 52, the spring 46 being as aforesaid under tension, collapses, and although the strip 5 remains stationary, the rack 40 is moved relative to said strip, through a distance corresponding to one step. If, however, the spring and rack of the order to which the carrying is to be transmitted be in motion at the time when the detent or stud 53 is removed from the path of the stud 54, the rack will continue to move with the strip 5 throughout the entire movement of the latter, the spring 46 acting at such time merely as a connecting link between the strip and rack and will not be stopped, as it commonly is, one step before the strip 5 completes its rearward movement—that is, in the latter case, the rack and strip will move together throughout the entire rearward movement of the strip, whereas normally the detent 53, acting on the stud 54, stops the rearward movement of the rack one step in advance of the completion of the corresponding movement of the strip.

The recording mechanism, including the aforesaid type carrying arms or sectors 2, is arranged between side plates 9, and includes any suitable number of such type carriers, ten being shown in the accompanying drawings, there being a row of numbered keys 6 for each of said type carriers. With each of said type carriers is associated a pivotally mounted hammer 10, shown as having a separately formed tail piece 11 provided at its free end with a lip 12 and a pin or stud 13, said pin and lip extending in opposite directions from the tail piece as shown most clearly in Fig. 1. The lip 12 of each hammer is engaged by the hook of a detent shown as a lever 14 pivoted at 15 and with which coöperates a pivotally mounted spring actuated, catch 16. Said catches 16 are mounted in a swinging frame, which at each operation of the machine moves so as to draw downwardly on said catches and thereby rock the detents 14 engaged therewith out of engagement with the lips 12 of the printing hammers. In columns where a key is depressed the type levers 2 will be moved sufficiently to carry projections 2ª thereon above studs 16ª on the catches 16. In columns where no key is depressed the type levers 2 are not moved sufficiently to carry their projections 2ª above the roller studs 16ª and when the catches 16 co-acting with such columns are moved downwardly as above described, their upper ends will be pushed forward by the projections 2ª and the hooks of the catches will not engage the detents 14 and consequently the hammers in such columns will not be released by the action of the catches 16. To print ciphers to the right of the column of the highest order in which a figure is printed, each detent 14 is provided with an upwardly extending finger 17, which extends across and in position to be operated by the stud or pin 13 of the hammer of the next higher denomination of the recorder, whereby at each actuation of the main or working shaft 18 of the machine, the hammers, corresponding to the rows of keys 6, in which keys have been previously depressed, or associated with the type carrying levers 2 of orders of less value than the highest denomination expressed by the depressed keys, will be released and caused to force a type on the respective arms 2 toward the platen 1. To restore the hammers to normal position there is a swinging frame consisting of side levers 78 and connecting bars 79, 80. A projection 81 on the cam 72 engages the bar 79 and swings the frame to lift the bar 80 and the hammers as the working shaft 18 rocks on returning to position. In starting, the said frame swings to carry the bar 80 down leaving the hammers free.

To add different amounts together, the number keys are depressed and by suitable operating means the working shaft 18 and the main cam 72 thereon are rocked. This permits the cross bar 69 to swing forward and allows the type carrying levers 2 and strips 5 to move, under the influence of the springs 73, until said strips are arrested by the stems of the depressed keys, or, in those rows where no keys have been depressed, by the detents which normally limit the movement of the strips to that sufficient to bring the zero type on the type carrying lever to the printing line. The racks 40 remain stationary until the strips have each moved one unit when the racks will also move forward with the strips. This permits each strip when no key is depressed to move sufficiently to bring the type carrier into position to print a cipher at the printing line. The first portion 72ᵇ of the main cam 72 permits no movement of the frame carrying the cross bar 69. A second portion 72ᶜ of said cam permits the entire forward movement of said frame and cross bar 69 and a third portion 72ᵈ does not effect the movement of the frame. This allows certain movements of other parts while the strip 5 and racks 40 are not in motion. By the forward motion of the strips 5 the type carrying levers connected with such strips are moved to bring the type corresponding to the depressed keys, and the zero type in the carriers associated with rows of keys where no key has been depressed, into position above the platen 1 and after the strips 5 are arrested and prior to the commencement of the return movement thereof, an arm 82 on the working shaft 18, through a link 83, rocks the swinging frame in which the spring actuated catches 16 of the hammer detents 14 are mounted and, as before described, releases the detents of the hammers corresponding to the rows in which keys have been depressed. After the strips are arrested the pinions 41 of the adder wheels are thrown into gear with the racks and on the return motion of the cam 72 the strips 5 and racks 40 are returned to their normal positions, the racks turning the pinions a number of units, depending on the extent of return movements of the strips 5 and equal to the numbers expressed by the depressed keys. The final part of the return movement of the working shaft 18 causes the plate 63 to move the lever 62 and link 61 to break the joint of the toggle 60, 59 and permit the frame carrying the adder wheels to rise and disengage the pinions from the racks.

Figure 9:
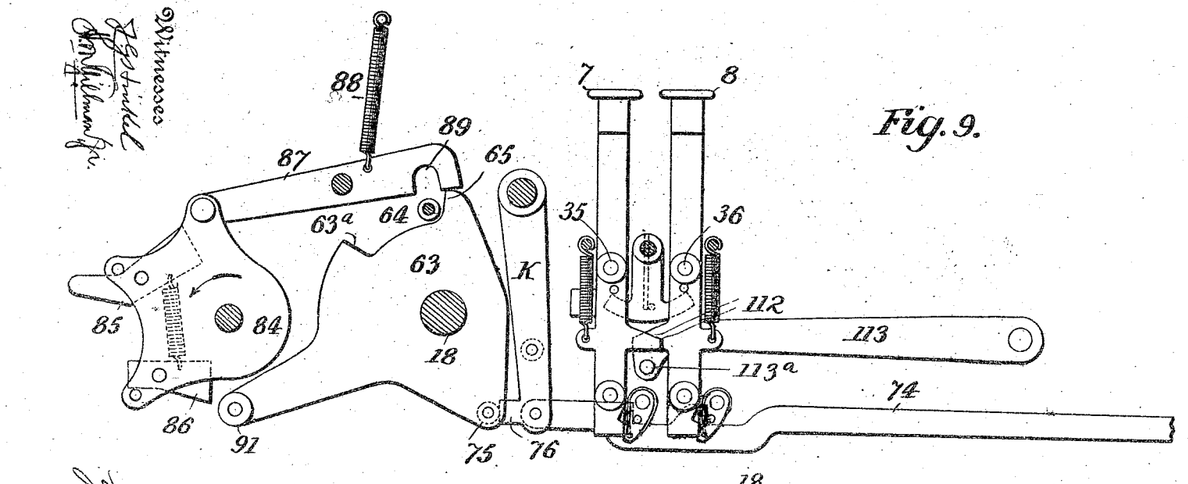
Fig. 9 is a sectional elevation on the line 9—9 of Fig. 10.
Figure 10:
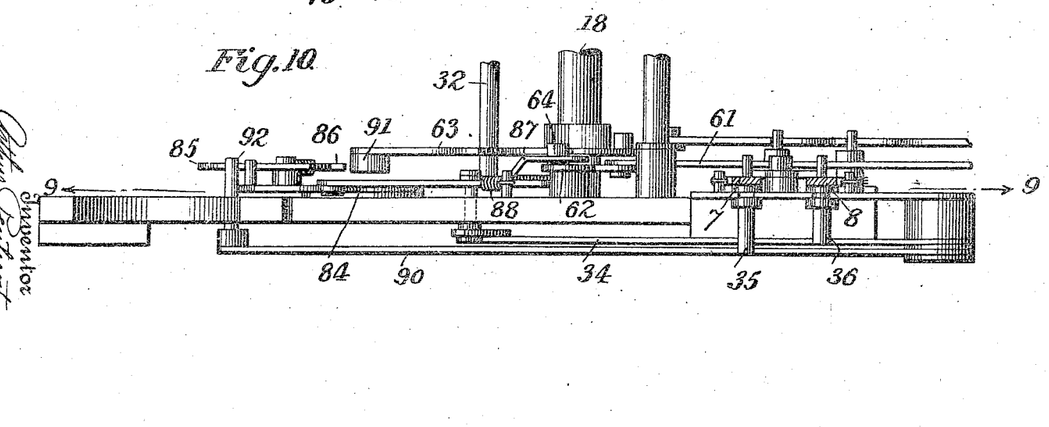
Fig. 10 is a plan view of the total and sub-total actuating mechanisms.

To record the total it is necessary to control the movements of the recording devices by the accumulating mechanism as, for instance, by controlling the movements of the racks by the pinions of the wheels 42, the racks in such case being engaged with the pinions 41 when the racks and the strips 5 are moving forward under the action of the springs 73. The rotary movement of the pinions and adding wheels is thus in the reverse direction to that when accumulating, the effect being that the amount accumulated is subtracted as the wheels and pinions return to their zero positions. The pinion cams 50 arrest this reverse rotation of the adding wheels at the zero position when their shoulders engage the lugs 51 of the detents 52. As in accumulating the wheels have advanced in the direction of the arrow, Fig. 11, a number of steps from the zero position, so in returning to the zero position the racks and strips are allowed to move forward the same number of steps until the pawls of the cams contact with the detents, thus moving the type levers correspondingly and bringing the number types in position to indicate the total accumulated. The accumulating wheels will be left at zero after the registering or printing of the total, except when the total is to be reaccumulated on the wheels 42, which is effected by keeping the racks 40 and pinions 41 engaged when the racks are again moved to the rear, or restored. These results are effected by so setting the parts as to vary the times of engaging and disengaging the racks and pinions and one means of doing this is by two keys, distinguished as "sub-total" and "total" keys 7 and 8, Figs. 1, 9 and 10. At the rear of the working shaft 18, is a shaft on which rocks a plate 84 carrying two dogs 85, 86, normally held in contact with stops by a connecting spring shown in dotted lines in Fig. 9. To this plate is pivoted a link 87 which is raised by a spring 88 and has a notch 89 adapted to engage the stud 64 on the lever 62. Two parallel levers 34, 90, extend past the keys 7, 8 and the lever 34 is connected with the link 87. When the "total" key 8, Figs. 1, 9 and 10, is depressed, its stud 36, depresses the lever 34 and the connecting link 87, the notch or slot 89 in which engages the stud 64 on the lever 62 so that said lever and link 61 will be operated from the plate 84. When the working shaft 18 commences to move the roll 91, Figs. 6 and 9, on the plate 63, moving upward, contacts with the rear edge of the dog 86 rocking the plate 84 in the reverse direction of its arrow, Fig. 9, and the link 87 (now connected to the lever 62, Fig. 6) and through the link 61 and connections straightens out the toggle and depresses the frame carrying the adding wheels, causing the pinions of said wheels to engage the racks 40, as the strips 5 move forward, until the wheels 42, turning in the reverse direction of the arrow, Fig. 11, return to the zero position, where they are arrested by the pawls of the cam 50 contacting with the projections 51 of the detents 52. The racks will be held in their forward position during the printing action, while the part 72ᵃ of the cam 72 on the work-shaft 18 moves in one direction past the roll 71, Figs. 3 and 5. On the return movement, the roll 91, Figs. 1 and 9, contacts with the forward edge of the upper dog 85 and rocks the plate 84 in the direction of its arrow, Fig. 9, and the link 87 pulls the lever 62 rearwardly, bending the toggle and lifting the frame carrying the adding wheels and disengaging the pinions of said wheels from the racks 40. The continued movement of the cam 72 restores the racks to their normal position.

The "sub-total" key 7, Figs. 1, 9 and 10, operates on a second lever 90 which has a lug 92 which, when the lever is depressed, contacts with the tail of the dog 85 and swings said dog out of the path of the roll 91 which roll in such case cannot operate said dog to rock the plate 84 and renders the said plate inoperative to shift the lever 62 and the toggle. The "sub-total" key stud 35 projects over both the levers 34 and 90, so that when the "sub-total" key is depressed the lever 34 is carried down with the lever 90 and the link 87 is engaged with the stud 64 on lever 62 and, therefore, when the machine is thus operated, the pinions of the adding wheels are drawn into engagement with the racks 40 as the plate 84 is rocked by the stud 91 and pawl 86 before the racks move forward, and they continue engaged on the reverse movement (as the stud 91 on returning will not contact with the pawl 85) until the racks are restored to their normal position, when the frame carrying the adding wheels is raised and the pinions are disengaged by the action of the shoulder 65 on the plate 63 contacting with the stud 64 on the lever 62, as in accumulating. When either the "total" key 8 or "sub-total" key 7 is depressed, it is necessary to swing the detents 103, out of the path of the stud 67, so that the strips 5 and racks may move under the control of the pinions. This is effected, Fig. 9, by a projection 112 on each of said keys 8, 7, which projections contact with a stud 113ᵃ on a pivoted arm 113, Figs. 7, 15 and 16. The rear end of arm 113 contacts with a bell crank lever 114, one end of which enters a slot in the strip 107 but does not interfere with the usual individual movements of the detents 103. When, therefore, either the "total" key or "sub-total" key is depressed its projection 112 depresses the arm 113, which rocks the bell crank lever 114 and moves the strip 107 to the left, thus swinging all the detents 103 out of their normal positions and releasing the strips 5.

Figure 2:
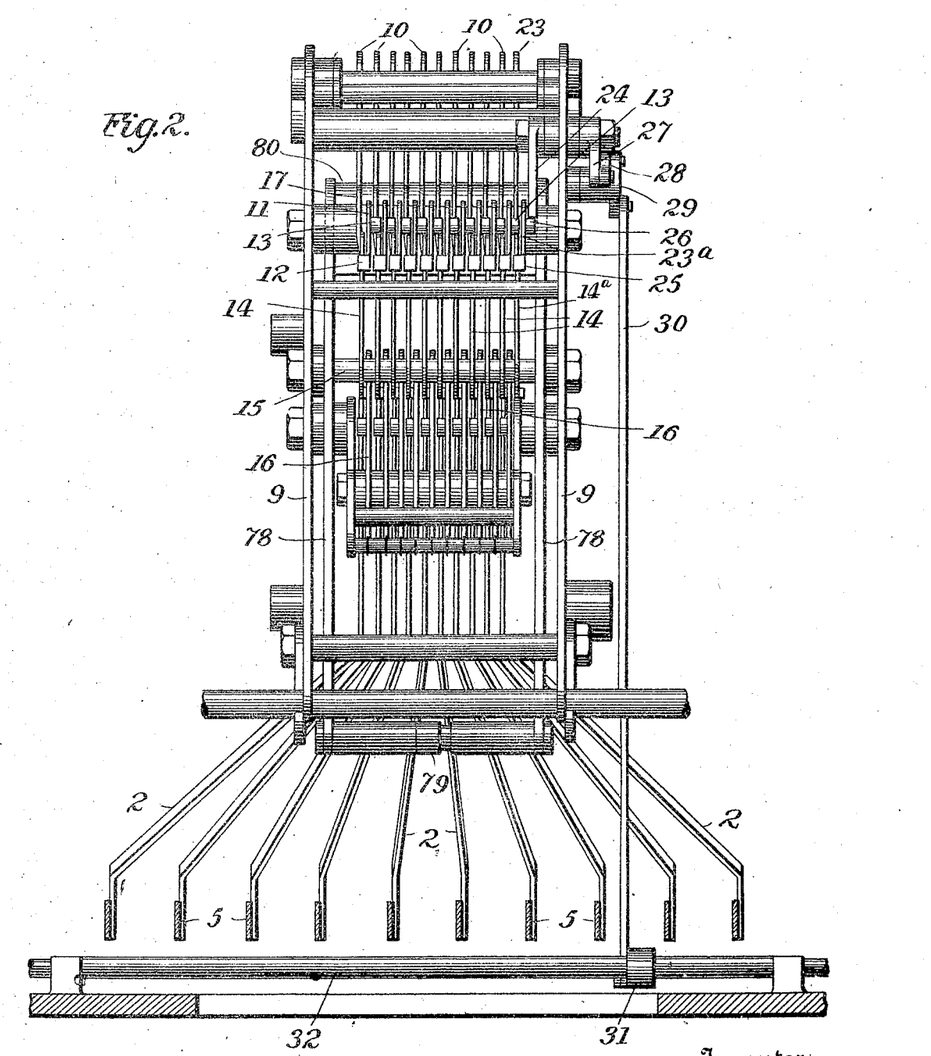
Fig. 2 is a vertical sectional view through a portion of the machine, on a larger scale than Fig. 1.
Figure 3:
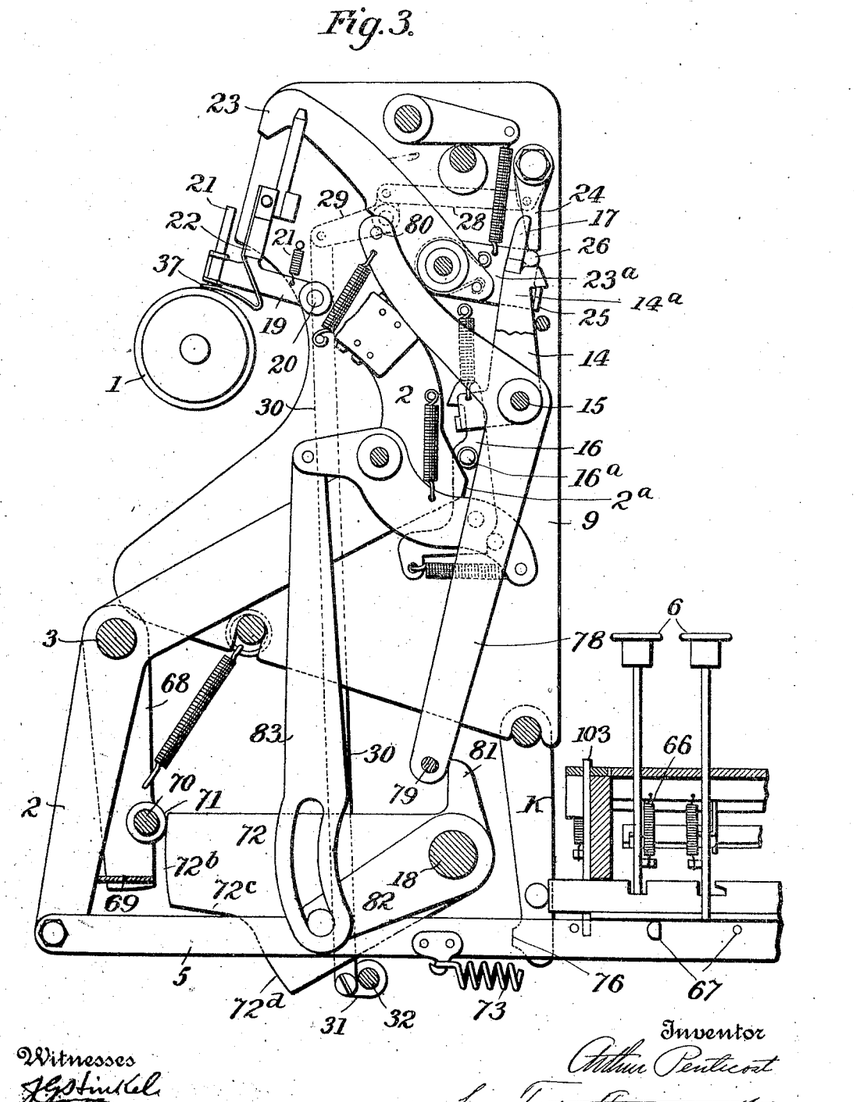
Fig. 3 is an elevation of the recording mechanism, parts of the operating devices shown in Figs. 1 and 2 being removed.

The foregoing description and the drawings illustrate the construction and operation of the accumulating and recording means of the calculating machine shown in the aforesaid Letters Patent No. 763,692, by means of which it is possible to accumulate and record a series of items and also to record "sub-totals" or "totals". In order that such "sub-totals" or "totals" may be printed or recorded and distinguished by a characteristic mark whenever either of the keys 7, 8, is actuated, the following means are employed. In an arm 19, pivotally mounted at 20 to one of the side plates 9, is supported a type bar 21 carrying at its lower end a type in the form of a star or other distinguishing character. The arm 19 is of such length that the type on the bar 21 is always in the printing line, or in position to imprint its character in line with the numerals recorded by the type on the sectors 2 at each actuation of the machine. Said arm is normally drawn upward about its pivot by a spring 21ᵃ, a suitable stop 22 limiting such upward movement. To operate the type bar 21, a hammer 23, similar in construction to the aforesaid hammers 10, is provided. That is, said hammer is provided with a tail piece 23ᵃ having a lip 25 and stud or pin 26 corresponding to the lip 12 and stud 13 of each of the hammers 10. The hammer 23 is normally maintained in inoperative position by a detent 24 mounted on the inner end of a short rock shaft journaled in bearings on the plate 9 and by a detent 14ª similar to and mounted in the same manner as the aforesaid detents 14. Said detent 24, as shown in Figs. 2 and 3, is adapted to lie above and engage the stud or pin 26 on the tail piece of the hammer 23. At its outer end the rock shaft carrying the detent 24 is provided with a short crank or arm 27 which is connected by a link 28 with one arm of a bell crank 29 mounted on the aforesaid side plate 9, and the other arm of which bell crank is connected by a link 30 with an arm 31 on a transverse shaft 32. An arm 33 on said shaft 32 is connected by suitable links to the lever 34 across the upper edge of which extend the studs 35, 36, respectively connected with the "sub-total" key 7 and "total" key 8. Therefore when either the "sub-total" or "total" key is depressed, the shaft 32 will be rocked and through the above described connections the detent 24 will be moved to inoperative position. As already described such movements take place immediately on the depression of either key 7, 8, and prior to the actuation of the main shaft 18, means being provided for positively preventing any actuation of such main shaft during the time that said "sub-total" or "total" keys are being actuated. When, therefore, either the "sub-total" or "total" key is depressed and the detent 24 moved to inoperative position, the hammer 23 will be actuated and the character represented by the type on the bar 21 printed at the right of the number recorded by the type of the several sectors 2 which have been operative during the recording of the several individual items. It will be seen that each of the hammers 10, and 23, is connected with a power spring tending to move the free end of the hammer downwardly into position to operate the type, such spring being held under tension by the action of the detents 14 and 24 respectively. If desired a spring arm 37 may be employed to hold the type bar 21 in an elevated position in the arm 19 by which it is carried.

Referring to Fig. 4, it will be seen that whenever a "sub-total" or "total" is recorded, a star or other distinguishing mark will be printed at the right thereof, so that such records will be clearly distinguished from the items of a column of figures.

The lip 25 of the hammer 23 is, as shown in Figs. 2 and 3, engaged by a detent 14ª, similar in form and mounted to rock about the same axis as the detents 14, and with the stud or pin 26 of said hammer coöperates the detent 24. The latter detent will be moved to inoperative position, as before described, whenever either the "total" or "sub-total" key is actuated. The hammer 23 will not be released and permitted to fall when the detent 24 is withdrawn from the path of movement of the stud 26 because it will still be held in its elevated position by the detent 14ª. This last detent will be moved to inoperative position by the pin 13 of the adjacent hammer 10 whenever at the time of actuating the shaft 18 one or more of the numbered keys are depressed, or when said shaft 18 is actuated after a number or numbers has or have been accumulated on the adding mechanism. To permit the hammer 23 to operate the type bar 21, therefore, it is necessary that both the detents 14ª and 24 controlling such hammer be moved to inoperative position. This is accomplished whenever a "total" or "sub-total" is recorded; but such hammer will not be released except when the adding wheels 42 have, by previous operations of the machine, been moved from their zero position. If the shaft 18 is actuated when the adding wheels are all in their zero position the hammer 23 will not be released even if the "total" key or "sub-total" key be depressed; but during such operation the hammer will be retained in its elevated position by the detent 14ª. This detent can only be released by the adjacent hammer 10 which, as before described, is held in inoperative, elevated, position unless at the time of actuating the shaft 18 one or more of the adding wheels occupy other than their zero positions or are moved from such zero position by the actuation of said shaft. Whenever the machine is "cleared", that is whenever the adding wheels are returned to their zero position by the actuation of the shaft, as results when a "total" is recorded, or whenever a "sub-total" is recorded, however, both detents 24 and 14ª are moved to inoperative position and the hammer 23 strikes the type bar 21 and causes the printing of the distinguishing mark or character. Such distinguishing character will not be printed however if the shaft 18 is actuated when the machine is "clear", even if the detent 24 be moved from operative position.

Having thus described the invention what is claimed and desired to be secured by Letters Patent is:—

1. The combination with an adding machine in which individual items are accumulated and printed and including suitable actuating means and supplemental "total" and "sub-total" devices, of means controlled by the action of the "sub-total" device for printing a suitable character to distinguish the "sub-total" from the individual items.

2. The combination with an adding machine in which individual items are accumulated and printed and including an operating shaft, means for actuating it, a "total" device and a "sub-total" device, of means controlled by the action of either of said devices for printing a suitable character to distinguish a "sub-total" or a "total" from the individual items.

3. The combination, in an adding machine adapted to accumulate and record individual items and to record the sum of items previously accumulated, a "total" key, a "sub-total" key, means, supplemental to the devices by which the items and totals are recorded, for printing a distinguishing character, a detent for preventing operation of said means during the recording of individual items, and means connected with both the "total" and "sub-total" keys for releasing said detent.

4. The combination with an adding machine in which individual items are accumulated and printed, of means supplemental to the actuating devices controlling the recording of a total, means controlling the recording of a sub-total including a key independent of the means controlling the recording of a total, and means for printing a distinguishing character whenever a sub-total is recorded.

5. In an adding machine in which individual items are accumulated and printed, the combination with accumulating devices, printing means, an operating shaft, connections between said shaft and the accumulating devices and printing means, and means for actuating said shaft, of two independent keys adapted to respectively control the operation of the machine to record a "total" and a "sub-total", and means for printing a character whenever either of said keys is actuated to distinguish the "total" or "sub-total" from the individual items.

6. The combination in an adding machine adapted to accumulate and record individual items and to record the sum of items previously accumulated, of means for recording a "total" of items recorded by the machine, a sub-total key independent of said "total" means, devices, supplemental to those by which the items and totals are recorded, for printing a distinguishing character, a detent for preventing operation of the last said devices during the recording of individual items, and means connected with the sub-total key for releasing said detent.

7. The combination in an adding machine adapted to accumulate and record individual items and to record the sum of items previously accumulated, of a "total" key, means for taking a sub-total including an element independent of said total key, devices, supplemental to those by which the items and totals are recorded for printing a distinguishing character, a detent for preventing operation of said means during the recording of individual items, and means for automatically releasing said detent when the "sub-total" means is actuated.

In testimony whereof I have signed my name to this specification in the presence of two subscribing witnesses.

ARTHUR PENTECOST.

Witnesses:
W. H. PYKE, Jr.,
E. C. BATAILLE.